Figure 1:
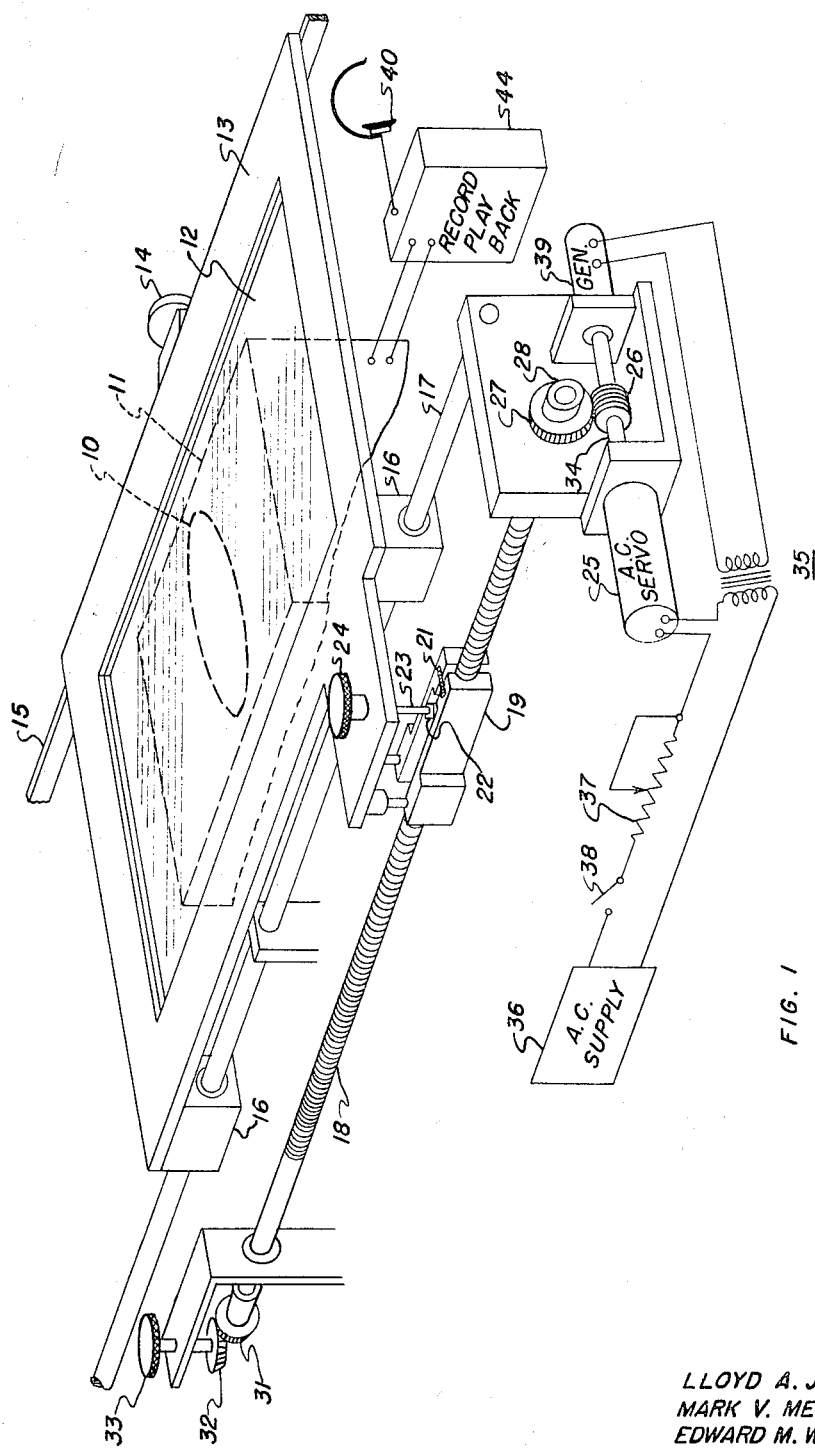

Oct. 4, 1966     L. A. JEFFRESS ETAL     3,276,124
ELECTRO-MECHANICAL DEVICE FOR GEOGRAPHICAL
PLOTTING OF PPI OSCILLOSCOPE INFORMATION
Filed Nov. 30, 1955     2 Sheets-Sheet 1

INVENTORS
LLOYD A. JEFFRESS
MARK V. MECHLER
EDWARD M. WIGHT

BY

ATTORNEYS

Oct. 4, 1966  L. A. JEFFRESS ETAL  3,276,124
ELECTRO-MECHANICAL DEVICE FOR GEOGRAPHICAL
PLOTTING OF PPI OSCILLOSCOPE INFORMATION
Filed Nov. 30, 1955                                          2 Sheets-Sheet 2

INVENTORS
LLOYD A. JEFFRESS
MARK V. MECHLER
EDWARD M. WIGHT

BY

ATTORNEYS

United States Patent Office 3,276,124
Patented Oct. 4, 1966

3,276,124
ELECTRO-MECHANICAL DEVICE FOR GEOGRAPHICAL PLOTTING OF PPI OSCILLOSCOPE INFORMATION
Lloyd A. Jeffress, Mark V. Mechler, and Edward M. Wight, Austin, Tex., assignors, by mesne assignments, to the United States of America as represented by the Secretary of the Navy
Filed Nov. 30, 1955, Ser. No. 550,229
4 Claims. (Cl. 33—1)

The present invention relates to geographical plotting and more particularly to a method and a device for plotting the geographical position of objects of interest such as objects on the ocean floor which have been detected by any suitable method such as, for example, echo ranging sonar.

In searching for submerged objects with sonar equipment a skilled operator can, by carefully observing the sonar display such as a plan position indication (PPI) presentation on the face of a cathode ray oscilloscope, note the range and bearing of targets with respect to his location, i.e., the ship's position. In a common form of PPI presentation an electron beam is swept across the face of the cathode ray tube radially from the center to the periphery, and this sweep is rotated about the central point as the directional transducer of the sonar system rotates in azimuth. Sound echoes from targets are used to intensify the sweep trace at points corresponding to their positions, and thus with the origin of the scan representing the position of the transducer the relative position of any target with respect to the origin is displayed linearly in both Cartesian and polar coordinates, i.e., an undistorted map of the targets is displayed. However, it is difficult to determine the geographical position of the ship at all times, as it proceeds along its course, with the accuracy required for the recovery and removal or destruction of the target objects because in most waters if the location of a target object such as a mine is not known within a few yards, it is almost hopeless for a diver to locate the object. Tracking arrangements employing shore based observation posts can accurately record the ship's position with respect to time and also with respect to targets called out by the sonar operator, so that the shore stations can mark on a map the locations of the targets called by the operator. Such an arrangement leaves something to be desired inasmuch as there is no direct check of the skill of the operator in recognizing targets, nor the accuracy with which he is able to call their range and bearing.

By recording in reproducible form the sonar signal in any suitable manner such as that described in application Serial No. 439,944, filed June 28, 1954, by Mechler and Wood, the sonar presentation can be played back time after time to make certain that all target images and their locations have been noted. In accordance with one embodiment of the present invention the playback PPI presentation takes place in the plane of a plotting table over which a transparent or at least translucent recording material is moved at a rate scaled to correspond to the ship's speed at the time the signal being reproduced was recorded. With this arrangement an observer watching the reproduced presentation plots the target contacts directly on the recording paper, so that at the end of the playback the recording paper when properly positioned as an overlay of the area in question will show the geographical location of each of the targets so plotted. This system has the additional advantage that by repeated playbacks attention can be given exclusively to target contacts which have not yet been plotted, to the end that after several such playbacks accompanied by plotting there is a reasonable certainty that all target contacts picked up by the sonar equipment have been accurately plotted.

In accordance with another embodiment of the invention the shore installation periodically reports the ship's position to the sonar operator who uses this information to control the movement of a tracing paper imprinted with a scale map of the area so that at the instant the shore installation locates the ship at a geographic point this same point on the map is passing the center of the display screen. More specifically, the scale map is moved over the sonar display screen at a speed such that a known geographic point passes the center of the display screen at the same time the fixed plotting stations report the ship located at that point. Thus, the targets plotted by the sonar operator directly provide a permanent record of the targets, such as a mine field.

Each of the above mentioned embodiments offers the distinctly advantageous feature of enabling the operator to correlate different target returns so as to distinguish them from non-targets such as random noise or fish. This is possible because different returns from a single target will appear at the same point on the moving plotting medium while moving fish or random targets will appear at different points from different returns.

The primary object of the present invention is to provide a method and apparatus for making geographic plots of PPI oscilloscope information.

Another object of the invention is the provision of means for moving a plotting medium at a speed which is strictly proportional to the speed of a ship along a previously plotted course.

A further object of the invention is to provide a method and apparatus which aids the distinguishing of stationary targets from moving or random targets in sonar scanning systems.

Figure 3:
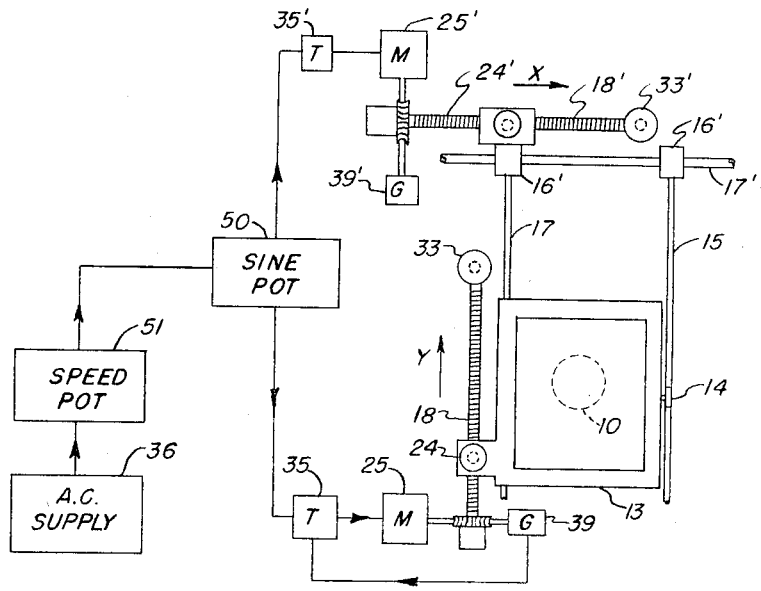
Figure 2:
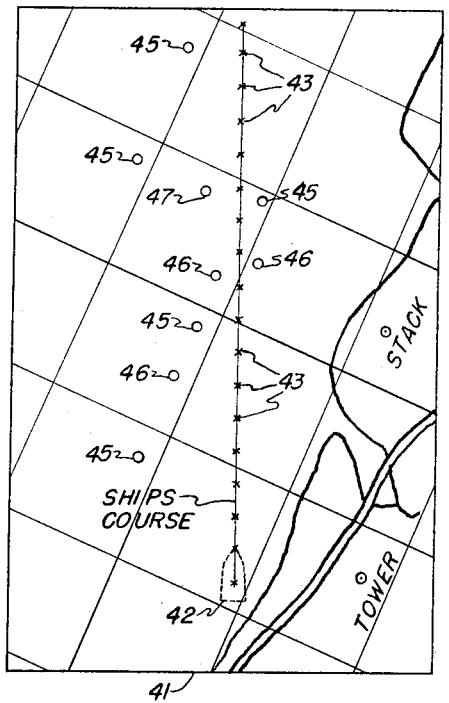

Other objects and advantageous features of the invention as well as the invention itself will be readily appreciated from a reading of the following description in connection with the accompanying drawing, in which FIG. 1 is a view in perspective of a plotting device incorporating the invention;

FIG. 2 is exemplary of a geographic plotting resulting from the practice of the invention; and FIG. 3 is a diagrammatic showing of an alternative embodiment of the invention.

As shown in FIG. 1 the face of a cathode ray oscilloscope 10 upon which the PPI presentation is to be displayed is mounted flush with the horizontal surface of its supporting chassis 11 over which a transparent or translucent plotting plate 12 is adapted to be moved for plotting in accordance with the invention. The plotting plate 12 is suitably carried in a plotting frame 13 which is supported on one side by an anti-friction roller 14 carried by the frame 13 and adapted to roll along the top surface of a rail 15. The other side of the frame 13 is provided with antifriction ball bushings 16 which are mounted for guided sliding movement along a rod 17 which is spaced from and parallel to the rail 15. The plotting frame 13 is moved along the rod 17 by a lead screw 18 through a split nut 19 which is held in threaded engagement with the lead screw 18 by a resilient member 21 which yields to permit the disengagement of the split nut 19 upon rotation of a cam 22. For this purpose, the cam 22 is provided with a shaft 23 ending in a knurled knob 24. As here shown, the lead screw 18 is driven by an A.C. servo-control motor 25 through a worm 26, a worm wheel 27, and a friction clutch 28. The clutch 28, which is preferably adjustable, has enough friction to provide a positive drive between the worm wheel 27 and the lead screw 18 for moving the frame 13, but this friction can easily be overcome by manual operation to turn the lead screw 18, as through miter gears 31 and 32, by turning a knob 33. For the reasons appearing below the knob 33 will be used for vernier adjustment of the position of the plotting frame 13 while coarse positioning of the frame 13 is readily obtained by turning the knob 24 to open the split nut 19, thereby permitting free longitudinal movement of the frame 13 along the rod 17.

The drive motor 25 which advances the frame 13 and its plotting plate 12 over the face of the display screen 10 also drives a tachometer generator 39 which preferably shares with the motor 25 a common shaft 34 which also carries the worm 26. The output voltage of the tachometer generator 39 is proportional to its speed and therefore proportional to the speed of the drive motor 25 as well as to the rate the plotting plate 12 is advanced over the display surface 10. This voltage output of the generator 39 is suitably coupled to the input circuit of the motor 25 through a transformer 35, the complete input circuit comprising in series a source of alternating current 36, a potentiometer 37, a switch 38, the motor 25, and the transformer 35. With this arrangement, for a given setting of the potentiometer 37 the speed of the motor 25 will be held constant despite small changes in its load. In other words the drive motor 25 and the tachometer generator 39 are connected in an inverse feedback arrangement.

In accordance with a preferred practice the utilization of the plotting device above described requires the cooperation of shore based plotting stations and means for recording the sonar echo signal. One suitable arrangement employing magnetic tape for recording and reproducing these signals is disclosed in the above referenced application of Mechler and Wood. The sonar information is recorded on the tape along with standard time indications which coincide with the time intervals the shore plotting stations make a record of the ship's course and plot the position of the ship at the standard time point. This plotting by the shore station is done on a scale map of the area and the resulting plotted course will appear as shown in FIG. 2. As here shown a map 41 of the area where the operation is taking place is utilized for plotting the course of a ship 42 with the position of the ship at each succeeding thirty second interval being indicated by the plotted points 43 which points 43, if the ship moves along this course at a constant speed of six knots, will be uniformly spaced along the ship's course at intervals corresponding to one hundred yards. The map 41 with the plotted positions 43 of the ship 42 along its course is now placed on the plotting table 12 and oriented thereon so that as the plotting frame is traversed over the face of the display surface of the oscilloscope 10 the points 43 will pass in succession over the center of the oscilloscope 10. With the map 41 thus oriented on the plotting table 12 the knob 24 is rotated to release the split nut 19, the frame 13 is traversed to bring the starting point 43 of the ship 42 at the center of the oscilloscope 10 and the knob 24 returned to the position where the split nut 19 again engages the lead screw 18. This places the equipment in condition for a playback operation.

From knowledge of the ship's speed gained during the plotting operation or by obtaining this speed from the plotted course the previously calibrated potentiometer 37 is set to correspond to this speed which may be as mentioned above, six knots. A record playback apparatus 44 is placed in operation to reproduce on the face of the oscilloscope 10 the sonar information to be analyzed and to play back separately the standard time signals which during recording were superposed on the record at fixed intervals, preferably of thirty seconds duration, and which during playback may be reproduced as audible notes such as by an earphone 40. When the initial timing pulse is heard or otherwise detected the switch 38 is closed to energize the motor 25 which moves the plotting frame 13 together with the scale map 41 at a speed which exactly or very closely represents the ship's speed along its course. When the second and each succeeding time signal is heard the succeeding plotted points 43 should appear on the oscilloscope at the center of the display, and if they do not, the overriding manual adjustment knob 33 is rotated the proper amount to compensate for any small error indicated by the off position of the time pulse. During this playback the operator watches for target signals and when one is noted he immediately plots it on the map 41. As indicated in FIG. 2 the targets noted during the first playback are represented by plotting points 45. If the operator feels that he may have missed one or more target signals, he will repeat the playback as above described and concentrate on possible target signals while ignoring those already plotted. On this second run he may be able to plot additional targets 46, and on the third run the additional target 47, after which he may be convinced that all target signals have been plotted. If, instead of plotting unknown targets, which is the case when a hostile mine field is being searched, it is desired to evaluate the skill of the operator then the record to be played back is one which was made while passing over a field where the exact position of each and every target is known but not, of course, by the operator, then by comparing the targets plotted by the operator with the known targets his skill can be evaluated. It is preferred in practice to have an assistant, or anyone other than the operator, control the traverse of the plotting frame 13 in accordance with the time signals as heard by such assistant to the end that the operator may give his undivided attention to the recognition and plotting of targets.

In the plotting arrangement above described in connection with FIGS. 1 and 2, the straight line representing the ship's course must be oriented, centered on and parallel to the direction of movement of the plotting frame 13 since this frame moves along a straight line in a fixed direction. There is shown in FIG. 3 a modified embodiment which employs similar driving arrangements for moving the plotting frame 13 in both $x$ and $y$ coordinates as indicated by arrows, the operating voltages for the individual drives being developed across a sine potentiometer 50 with the governing voltage being set in by a speed potentiometer 51 so that the resultant speed of the plotting frame 13 is proportional to the ship's ground speed. The operation of the device shown in FIG. 3 is in all other ways similar to that of the device shown in FIG. 1 and as described in detail above. More specifically, the motor 25 traverses the plotting frame 13 in the $y$ direction and a motor 25' traverses the plotting frame in the $x$ direction through its lead screw 18' by moving in assembly the rod 17 and the rail 15 and their associated mechanism along a rod 17'. The several components of the mechanism for traversing the plotting frame 13 in the $x$ direction perform the same function and operate in the same manner as the corresponding components above described in detail in connection with FIG. 1 so as to justify the use of the same reference numerals accented by a prime mark.

The ability of the apparatus of FIG. 3 to move the plotting frame 13 in two dimensions makes it possible to orient the scale map 41 on the plotting frame 13 with a meridian parallel to an edge of the frame 13 and cause the plotted course of the ship to pass over the center of the oscilloscope 10 by setting the proper angle into the sine potentiometer 50.

It will be appreciated from the above description that the present invention provides a method and apparatus for accurately plotting the geographic positions of underwater objects which appear as targets on the display scope of a sonar searching system. These objects as thus accurately plotted may be destroyed or otherwise rendered harmless by well-known mine countermeasures, or as is frequently desired when these objects are hostile mines they can be recovered for study to determine the most appropriate countermeasures to be pursued. Also this permanent record is available for direct comparison with later prepared records to determine whether additional mine-like objects have been deposited in this particular geographical area. The mechanism provided by the invention for traversing a scale map of the area over the sonar display in strict accordance with the speed and direction of a ship's course plotted thereon enables the operator to distinguish between true targets, which appear to remain stationary with respect to the scale map, from moving and random or false targets which do not continue to appear at fixed points on the map. This is true whether or not these targets are plotted during the original search period or by playback of a recording of the sonar signals made during the original search period.

While for the purpose of disclosing the invention so that others may benefit from the practice thereof certain procedures and apparatus have been described in detail, it is to be understood that other procedures may be followed and other mechanisms may be utilized without departing from the spirit of the invention the scope of which is pointed out in the appended claims.

What is claimed is:

1. Apparatus for plotting targets displayed by a sonar scanning system in PPI presentation on an oscilloscope screen comprising a movable plotting table supported parallel to and overlying the face of said screen, power operated means for moving the plotting table in its plane at a preselected rate comprising a lead screw rotatable to move the table in a fixed direction, a variable speed motor, a driving connection including a friction clutch between the motor and the lead screw, manually operated means directly coupled to the lead screw whereby the friction of the clutch may be overcome to rotate the lead screw, and means for adjusting the speed of the motor to move the table at said preselected rate.

2. Apparatus in accordance with claim 1 wherein a tachometer generator driven by the variable speed motor has its output voltage coupled to the input of said motor in an inverse feedback arrangement, whereby the speed of said motor does not change with variations in the load it is driving.

3. A method of geographic plotting of underwater sonar targets as displayed by PPI presentation on the face of a cathode ray oscilloscope comprising sailing a sonar ship along a straight course at a substantially constant speed, simultaneously recording sonar signals reflected by objects along said course in a sector being searched and signals representative of fixed intervals of time, plotting on a scale map the geographic position of the ship at the end of each successive time interval, establishing a line through said plotted ship's positions to provide the ship's course, playing back the recorded signals to produce a PPI presentation of the sonar signals and an indication of the time signals and simultaneously therewith moving the scale map over the PPI presentation at a rate such that the successive plotted ship's positions pass the center thereof in synchronism with the indicated time signals corresponding thereto, whereby signals representative of fixed targets will appear stationary with respect to the moving map, and plotting on the moving map all such stationary target signals.

4. A method of geographic plotting of underwater sonar targets as displayed on the face of a cathode ray oscilloscope comprising sailing a sonar ship along a course at a substantially constant speed while scanning the sea bottom with a sonar system which displays the reflection characteristics of the sea bottom on the screen of a cathode ray tube, moving across the screen of said tube a scale map of the area in such manner that the point on the map corresponding to the geographic position of the ship coincides with the axis of the display on said screen and the path of this axis along the map coincides with the ship's course, and plotting on the map those targets which remain stationary with respect to the map.

References Cited by the Examiner

UNITED STATES PATENTS

| | | | |
|---|---|---|---|
| 1,462,100 | 7/1923 | Caproni | 33—1 |
| 1,710,555 | 4/1929 | Tascarella | 33—1 |
| 2,566,247 | 8/1951 | Pierce | 33—1 |
| 2,694,804 | 11/1954 | Wagner | 340—282 |
| 2,718,061 | 9/1955 | Omberg | 33—1 |

FOREIGN PATENTS 156,487  10/1932  Switzerland.

LEONARD FORMAN, *Primary Examiner.*

SAMUEL BOYD, *Examiner.*

D. D. DOTY, A. M. HORTON, *Assistant Examiners.*